United States Patent [19]

Tsunetomi et al.

[11] Patent Number: 5,754,101
[45] Date of Patent: May 19, 1998

[54] TIRE AIR PRESSURE WARNING APPARATUS

[75] Inventors: Seishi Tsunetomi, Gifu-ken; Hideo Yamada, Ogaki, both of Japan

[73] Assignee: Pacific Industrial Co., Ltd., Gifu-ken, Japan

[21] Appl. No.: 525,824

[22] Filed: Sep. 8, 1995

[30] Foreign Application Priority Data

Dec. 22, 1994 [JP] Japan .................. 6-336255

[51] Int. Cl.$^6$ .................. B60C 23/00; B60C 23/02
[52] U.S. Cl. .................. 340/442; 340/445; 73/146.5; 73/146.8
[58] Field of Search .................. 340/442, 445, 340/447, 448, 539, 626; 73/146.3, 146.5, 146.8, 146.4; 116/34 R; 200/61.25

[56] References Cited

U.S. PATENT DOCUMENTS

| | | | |
|---|---|---|---|
| 3,185,785 | 5/1965 | Howard | 340/442 |
| 4,254,312 | 3/1981 | Migrin et al. | 73/146.8 |
| 4,335,283 | 6/1982 | Migrin | 73/146.8 |
| 4,531,473 | 7/1985 | Winther | 73/146.8 |
| 4,737,760 | 4/1988 | Huang et al. | 340/445 |
| 4,998,092 | 3/1991 | Ohno et al. | 340/442 |
| 5,040,561 | 8/1991 | Achterholt | 73/146.5 |
| 5,040,562 | 8/1991 | Achterholt | 73/146.5 |

FOREIGN PATENT DOCUMENTS

| | | | |
|---|---|---|---|
| 4 13 3993 | 4/1993 | Germany | 340/442 |
| 4 30 3591 | 8/1994 | Germany | 340/442 |
| 4-74202 | 11/1992 | Japan. | |
| 6-43536 | 6/1994 | Japan. | |

Primary Examiner—Brent A. Swarthout
Assistant Examiner—Van T. Trieu
Attorney, Agent, or Firm—Sheridan Ross P.C.

[57] ABSTRACT

A signal transmitter mounted on a wheel of a vehicle is disclosed. The transmitter includes a stem member and a cap member being arranged to be detachably mounted on the stem member. The stem member serves as a tire valve when the cap member is detached from the stem member. The stem member detects an tire air pressure smaller than a predetermined level when the cap member is attached to the stem member. The cap member transmits a warning wave signal based on the detection of the stem member. The stem member has an air passage extending in the accommodating member from the open end to the closed end. An electrical conductor is disposed in the air passage to be electrically connected to the cap member when the cap member is mounted on the stem member. A pressure chamber is separated by a partition form the air passage. A tire air introducing passage communicates with the air passage and the tire at a point closer to the open end than the pressure chamber. A bore is formed in the partition to allow a communication of pressure chamber with the introducing passage. A diaphragm expands in the pressure chamber in accordance with pressure lower than a predetermined level flown into the pressure chamber through the introducing passage and the connecting means. An instructing member is secured to the diaphragm for the integral movement and outputs an instruction signal to the cap member through the conductor.

10 Claims, 6 Drawing Sheets

TIRE AIR PRESSURE WARNING APPARATUS

BACKGROUND OF THE INVENTION

1. Field of the Invention

The present invention relates to a transmitter for an apparatus which warns a driver of abnormal air pressure in an automobile tire. More particularly, it pertains to a transmitter of a tire air pressure warning apparatus provided with a tire valve function for enabling inflation of a tire, which is mounted on a tire to warn the driver of a decline in tire air pressure.

2. Description of the Related Art

A decline in tire air pressure leads to uncomfortable driving and degrades vehicle performance. Accordingly, apparatuses which detect low tire air pressure and warn the driver have been proposed.

Figure 4:
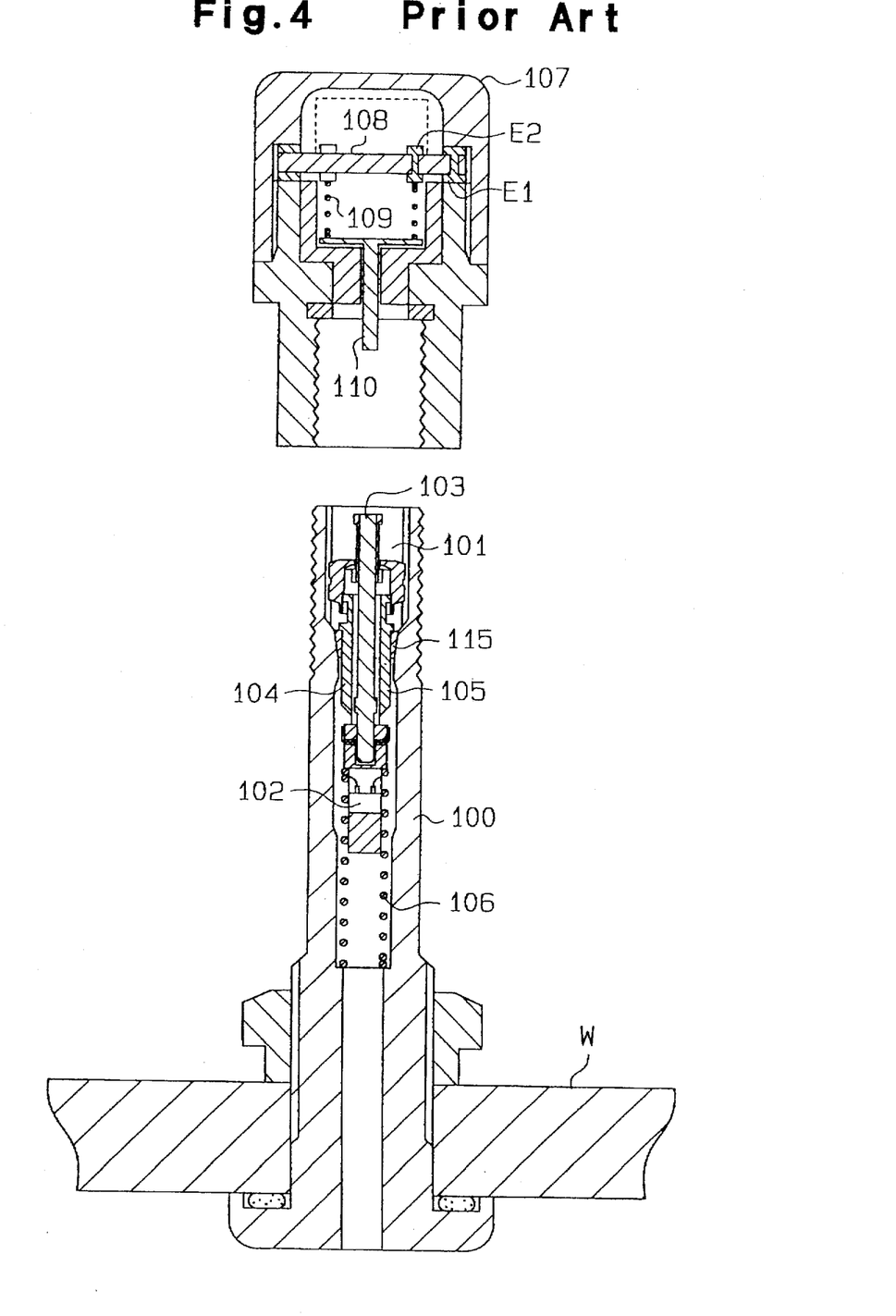
FIG. 4 is a cross-sectional view of a conventional transmitter incorporating a tire valve.

Such apparatuses includes a portable transmitter which is attached to the vehicle tires. The transmitter constantly detects the tire air pressure and functions as a portable transmitter when the air pressure becomes lower than a predetermined value. Japanese Examined Patent Publication 4-74202 discloses such a transmitter. As shown in FIG. 4, the transmitter has a tubular stem 100 which is fixed to a wheel rim W of an automobile. The stem 100 is made of a conductive material and communicates with the inside of a tire. An air passage 101 extends throughout the stem 100 in the longitudinal direction. A sensor portion 105 is accommodated in the air passage 101. The sensor portion 105 includes an air pressure sensor 102, a core 104, and a conductive contact end 103 connected to the core 104. The air pressure sensor 102 detects the air pressure inside the tire via the air passage 101. The sensor portion 105 is urged in the upward direction of FIG. 4 by a spring 106. A sliding portion 115, attached to the outer surface of the sensor portion 105, contacts with the air passage 101 in a manner such that air flows between the air passage 101 and sliding portion 115 to allow inflation of the tire.

A cap 107, shown in FIG. 4, is attached on the upper portion of the stem 100. An electric circuit board 108, provided with two terminals E1, E2, is fixed to the inside of the cap 107. A T-shaped contact portion 110 is connected to the bottom surface of the board 108 via a spring 109. By attaching the cap 107 to the stem 100, the terminal E1 comes into electrical contact with the stem 100 while the contact portion 110 comes into electrical contact with the contact end 103 thereby electrically connecting the circuit board 108 to the sensor portion 105.

Figure 5:
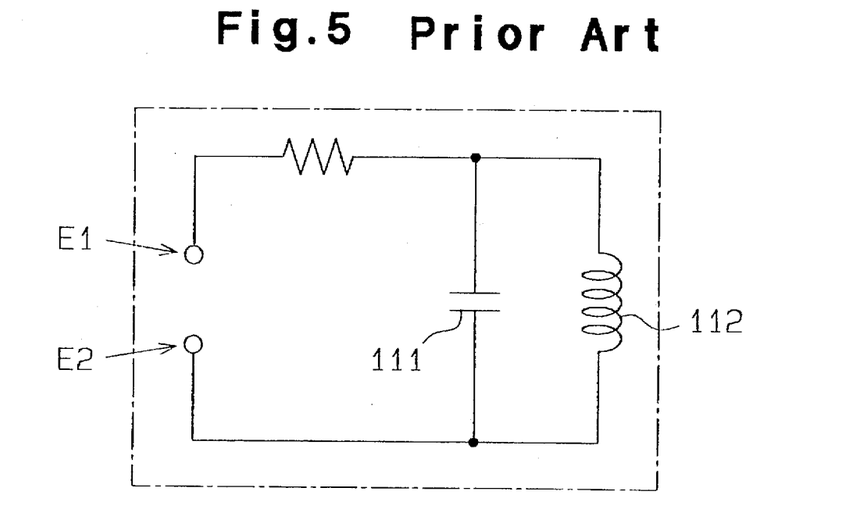
FIG. 5 is an electric circuit diagram showing the actuating principle of the transmitter shown in FIG. 4.

The circuit board 108 inside the cap 107 includes a resonance circuit formed by parallel connection of a condenser 111 and a coil 112 with the terminals E1, E2 as shown in FIG. 5. When tire air pressure becomes lower than a predetermined value, the resonance circuit, actuated by a signal from the air pressure sensor 102, transmits a magnetic warning signal.

Figure 6:
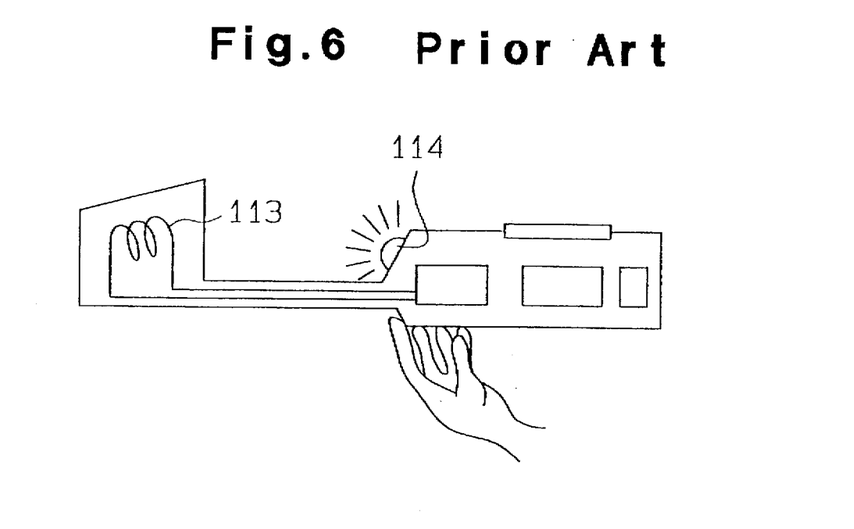
FIG. 6 is a schematic view of a receiver which receives signals sent from the transmitter shown in FIG. 4.

The magnetic warning signal is received by a receiver shown in FIG. 6. The receiver is provided with a coil 113. When the coil 113 receives the signal sent from the coil 112 of the transmitter, a lamp 114 is lit or flashed for warning.

The transmitter employs electromagnetic induction to transmit a signal to the receiver. Hence, it is necessary to approach the receiver to the transmitter to receive the signal. Therefore, inspection of tire air pressure is conducted by stopping the automobile and holding the receiver in proximity to the transmitter. Consequently, it is impossible for the driver to be warned of the decrease in the tire air pressure while driving. Accordingly, there has been a need for a transmitter capable of sending warning signals to a receiver mounted in the interior of an automobile to warn the driver of a decline in tire air pressure while driving.

Figure 7:
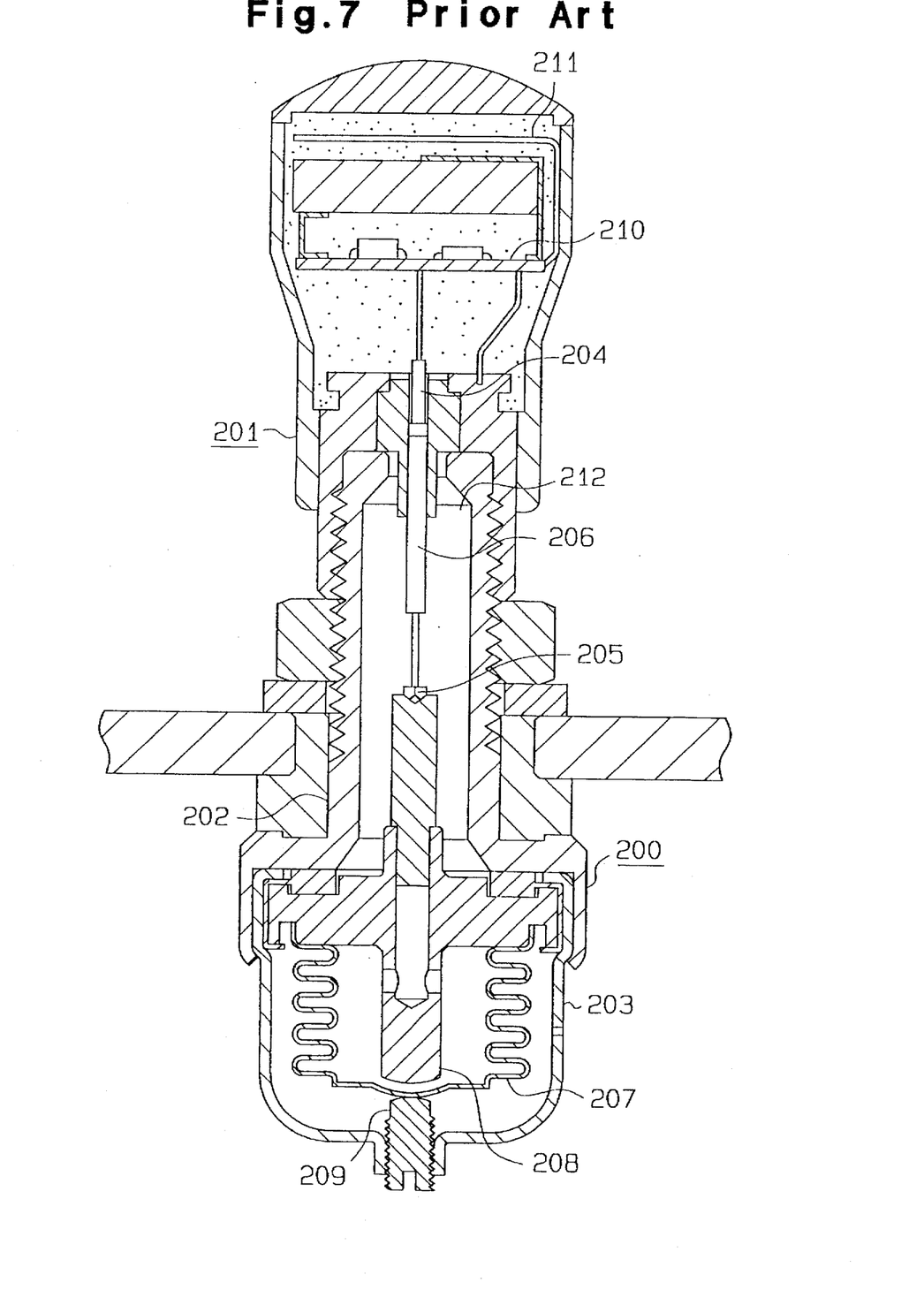
FIG. 7 is a cross-sectional view of a conventional transmitter without a tire valve function.

Japanese Unexamined Utility Model 6-43536 discloses a transmitter which sends warning signals to a receiver mounted in the interior of an automobile. As shown in FIG. 7, this transmitter comprises a pressure sensor 200 and a cap 201 which is attached to the sensor 200. The sensor includes a tubular body 202, which is closed at the bottom end by a case 203. A shaft 206 provided with terminals 204, 205 at its top and bottom ends is disposed in the tubular body 202. The tire air pressure which is conveyed to the inside of the case 203 deforms a metal bellows 207 according to changes in the pressure value. This causes the bellows 207 to come into contact with either a stopper 208 or a case terminal 209 depending on the pressure value. Contact between the bellows 207 and the terminal 209 actuates a transmitting circuit board 210 arranged in the cap 201. A radio wave signal is then sent to the receiver mounted in the automobile interior via a disk-shaped antenna 211. This warns the driver of the decline in tire air pressure.

In this structure, the entire outer surface of the bellows 207 receives the tire air pressure. The bellows 207 also divides the case into two sections in the vertical direction. Therefore, an opening 212, at the top end of the sensor 200, is not communicated with the inside of a tire. Hence, this structure prevents the transmitter from incorporating a tire valve function. Accordingly, there is a need for a transmitter capable of both transmitting warning signals, which inform the driver of low tire air pressure while diving, and functioning as a tire valve.

SUMMARY OF THE INVENTION

The object of the present invention is to provide a transmitter for a tire air pressure warning apparatus with a tire valve function.

A further object of the present invention is to provide a transmitter for a tire air pressure warning apparatus which is superior in economic viewpoints.

To achieve the above objects, a signal transmitter mounted on a wheel of a vehicle is proposed. The transmitter includes a stem member and a cap member being arranged to be detachably mounted on the stem member. The stem member serves as a tire valve when the cap member is detached from the stem member. The stem member detects tire air pressure smaller than a predetermined level when the cap member is attached to the stem member. The cap member transmits a warning wave signal based on the detection of the stem member. The stem member has an air passage extending in the accommodating member from the open end to the closed end. An electrical conductor is disposed in the air passage to be electrically connected to the cap member when the cap member is mounted on the stem member. A pressure chamber is separated by a partition from the air passage. A tire air introducing passage communicates with the air passage and the tire at a point closer to the open end than the pressure chamber. A bore is formed in the partition to allow a communication of pressure chamber with the introducing passage. A diaphragm expands in the pressure chamber in accordance with pressure lower than a predetermined level flown into the pressure chamber through the introducing passage and the connecting means. An instructing member is secured to the diaphragm for the integral movement and outputs an instruction signal to the cap member through the conductor.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

DETAILED DESCRIPTION OF THE PREFERRED EMBODIMENT

Figure 1:
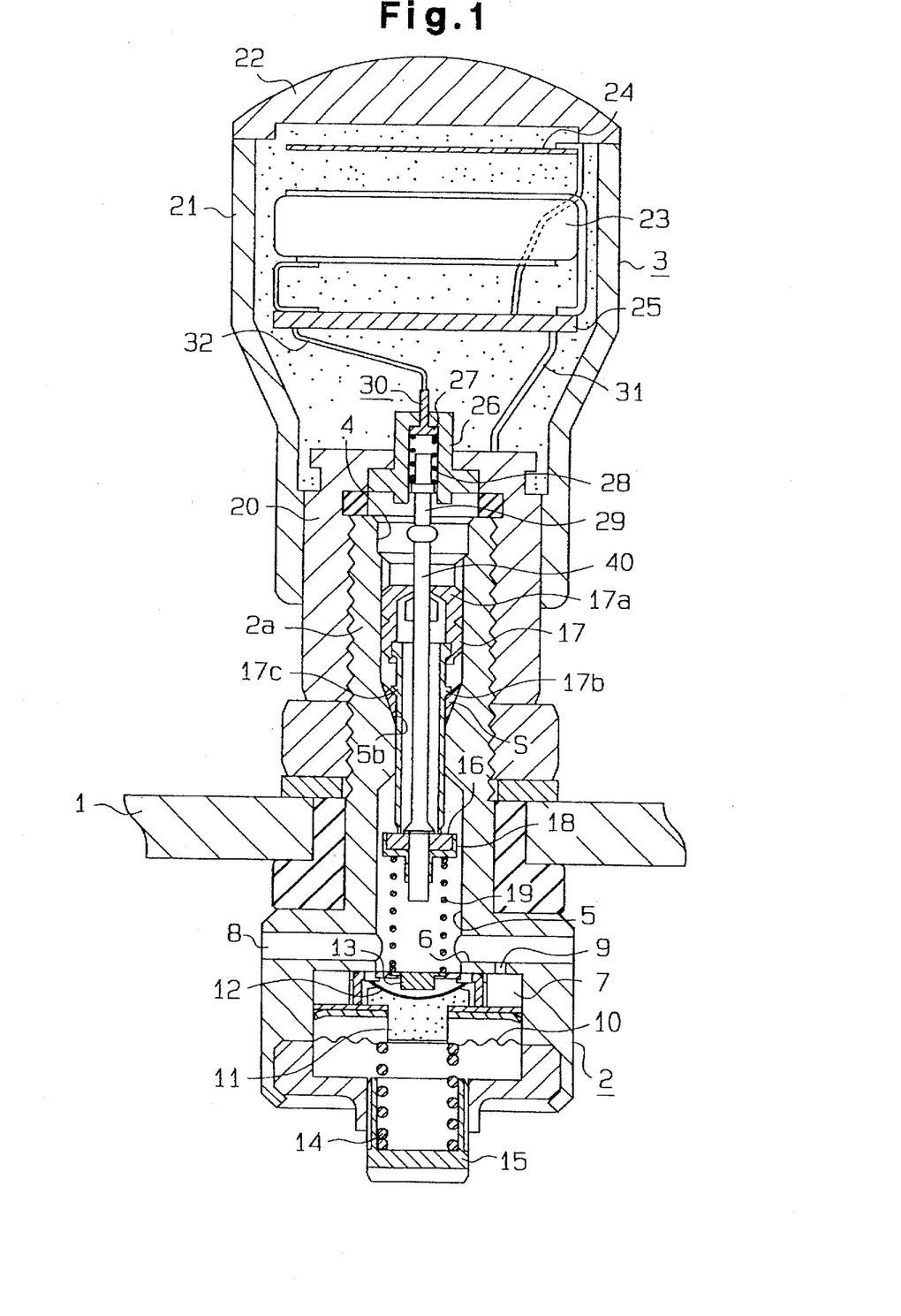
FIG. 1 is a cross-sectional view showing a transmitter for a warning apparatus in a low tire air pressure state according to the present invention.
Figure 3:
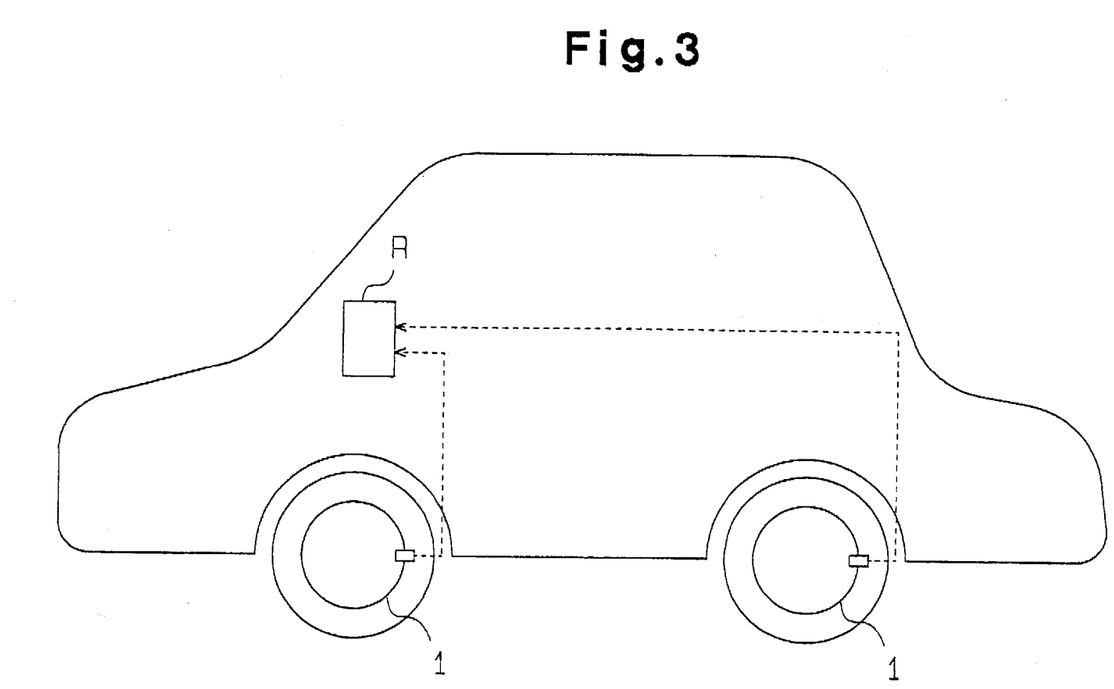
FIG. 3 is a schematic view showing the transmitter attached to a wheel rim sending signals to a receiver.

FIG. 3 shows a transmitter for a tire air pressure warning apparatus attached to each wheel of an automobile. As shown in FIG. 1, the transmitter comprises a switch portion 2 and a transmitting portion 3. The switch portion 2 is tubular and has a closed bottom. The transmitter is utilized by attaching the transmitting portion 3 on to the switch portion 2. When the switch portion 2 and the transmitting portion 3 are in the attached state, the switch portion 2 detects abnormal, or low tire air pressure and sends a signal to the transmitting portion 3. The switch portion 2 functions as a tire valve when the transmitting portion 3 is not attached.

The switch portion 2 will first be described. The switch portion 2 includes a tubular body 2a which is made of a conductive material. The body 2a has an accommodating passage 5 extending from an opening 4 at the top end to the bottom end. Below the passage 5, a partition 6 defines a pressure chamber 7 partitioned from the passage 5. The passage 5 communicates with the inside of the tire through a communicating passage 8 extending laterally above the partition 6. The passage 8 communicates with the pressure chamber 7 via a small pressurizing hole 9.

A diaphragm 10 is disposed at the lower portion of the pressure chamber 7. The diaphragm 10 moves vertically according to the tire air pressure which is communicated through the pressure chamber 7 via the communicating passage 8 and pressurizing hole 9. A movable terminal 12 is supported by a holding piece 11 made of a resin material on the diaphragm 10. A fixed terminal 13 is secured to the upper wall of the pressure chamber 7 facing the movable terminal 12. The movable terminal 12 comes into contact with the fixed terminal 13 when the tire air pressure becomes lower than a predetermined value. A spring 14 for adjusting load is set between the lower surface of the diaphragm 10 and the bottom surface of an adjusting bolt 15. Axial movement of the adjusting bolt 15 enables fine adjustment of a displacement point at which the diaphragm 10 reacts to pressure.

A conductive shaft 40, which is movable in the vertical direction, is disposed in the accommodating passage 5. A packing 16, supported by a conductive packing support 18, is made of a non-conductive material and fixed to the outer cylindrical surface of the shaft 40 at its bottom end portion. The shaft 40 is supported by a guiding member 17. The member 17 is made of an insulating material and attached to the inner cylindrical surface of the tubular body 2a. The member 17 comprises a head portion 17a and a main portion 17b. The head portion 17a, secured to the inner cylindrical walls of the passage 5, ensures smooth vertical movement of the shaft 40. A seal S tightly seals the space between a projecting ring 17c formed on the main portion 17b and a stepped portion 5b formed on the inner cylindrical wall of the passage 5.

Figure 2:
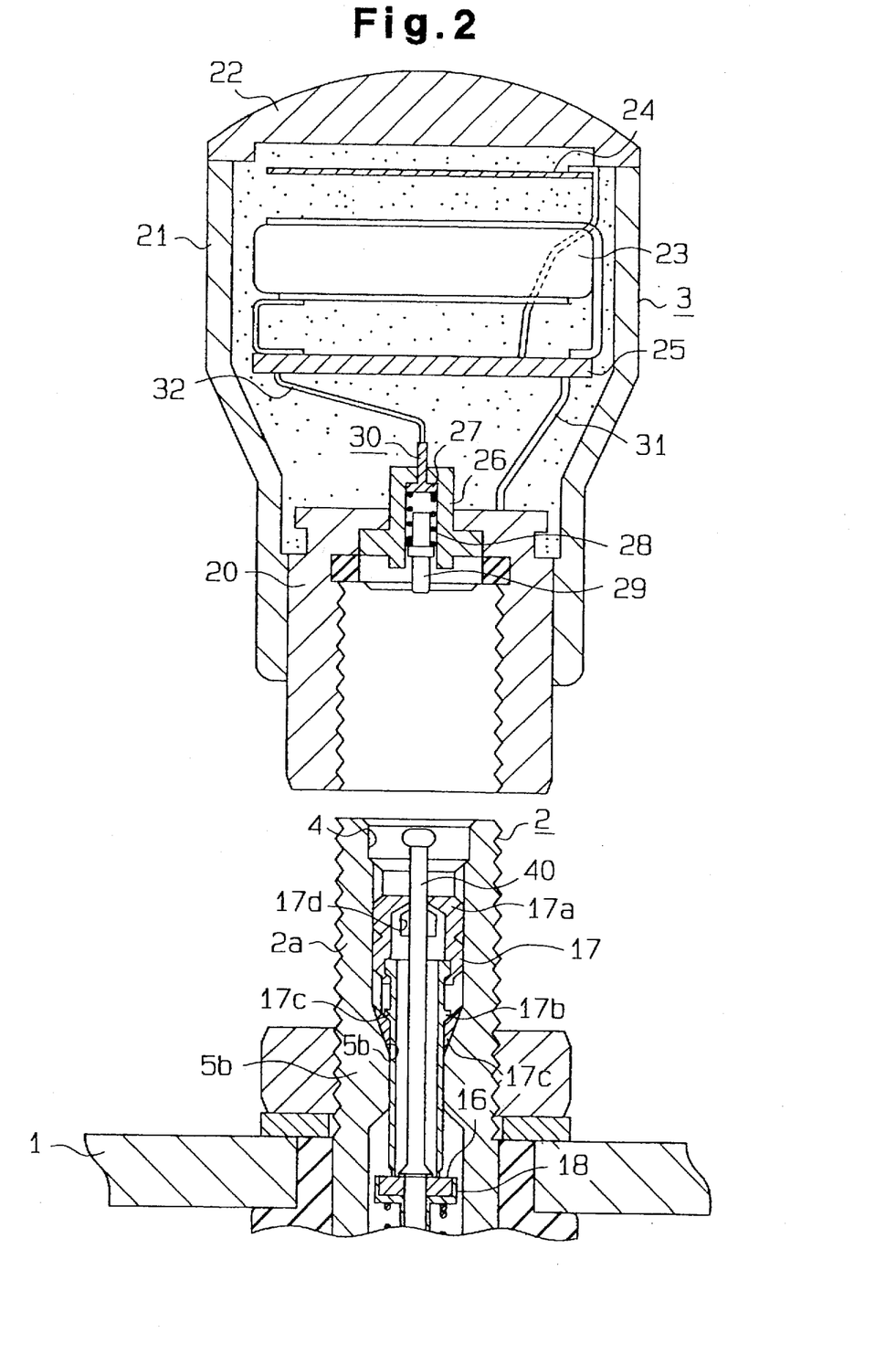
FIG. 2 is a cross-sectional view showing a cap separated from the transmitter.

To use the switch portion 2 as a tire valve, the transmitting portion 3 is separated from the switch portion 2 as shown in FIG. 2. Since the space between the main portion 17b of the guiding member 17 and the inner cylindrical surface of the tubular body 2a is tightly sealed by the seal S, and the bottom end of the guide member 17 is tightly sealed by the packing 16, a reversed flow of the air inside the tire escaping outside of the switch portion 2 is prevented. Inflation from the opening 4 causes air to enter into the head portion 17a via a window 17d formed in the guiding member 17. The air then flows through the inside of the main portion 17b and moves the packing 16 against the force of the spring 19. Afterward, the air reaches the bottom portion and enters the inside of the tire via the communicating passage 8. In this manner, the switch portion 2 is used as a tire valve.

The transmitting portion 3 comprises an inner nut 20, an upper case 21, and a cap 22. The inner nut 20 is conductive and is screwed on to the tubular body 2a of the switch portion 2. The upper case 21 is fitted on the inner nut 20. The cap 22 closes the case 21 from above. A disk-shaped antenna 24, a circuit board 25, and a battery 23 located between the antenna 24 and board 25, are arranged in the case 21. A cylinder 26 is disposed below the circuit board 25. The cylinder 26 has a reversed-cup configuration and is made of an insulating material. A contact probe 30 is accommodated in the cylinder 26. The contact probe 30 includes a Din 27 which is vertically movable, a spring 28, and a needle 29 which are conductive. A lead wire 31 extending from the circuit board 25 is connected to the inner nut 20. Another lead wire 32 also extending from the circuit board 25 is connected to the pin 27 of the probe 30. The transmitting portion 3 is produced by first assembling the inner nut 20 and the case 21 together. The antenna 24, circuit board 25, cylinder 26, and probe 30 are then arranged in the case with the wires 31, 32 connected as described above. The case 21 is then filled with silicone resin and finally sealed by the cap 22.

By screwing the transmitting portion 3 on to the switch portion 2, the needle 29 of the probe 30 contacts the conductive shaft 40. As described above, the tire air pressure falling lower than a predetermined value displaces the diaphragm 10 upward and causes contact between the movable terminal 12 and the fixed terminal 13. This establishes an electrically conductive circuit starting from the lead wire 32. The circuit proceeds to the probe 30, conductive shaft 40, packing support 18, spring 19, fixed terminal 13, movable terminal 12, tubular body 2a, inner nut 20, lead wire 31 and is finally closed by connection to the circuit board 25. In this closed state, the antenna 24 transmits a radio wave signal. This signal is received by a receiver R mounted in the interior of an automobile as shown in FIG. 3. The receiver R then warns a driver of low tire air pressure through an appropriate means such as a visual display, audible signal, or voice announcement.

The movable terminal 12 and the fixed terminal 13 are not in contact with each other when the tire air pressure is higher than the predetermined value. Hence, the electrically conductive circuit is opened. Therefore, the driver can confirm whether the tire air pressure is at a normal value or not while driving.

Although only one embodiment of the present invention has been described herein, it should be apparent to those skilled in the art that the present invention may be embodied in many other specific forms without departing from the spirit or scope of the invention. Therefore, the present examples and embodiment are to be considered as illustrative and not restrictive and the invention is not to be limited to the details given herein, but may be modified within the scope of the appended claims.

What is claimed is:

1. A signal transmitter, mounted on a wheel of a vehicle, including a stem member and a cap member being arranged to be detachably mounted on said stem member, wherein said stem member serves as a tire valve when said cap member is detached from said stem member and said stem member detects a tire air pressure smaller than a predetermined level when said cap member is attached to said stem member, and wherein said cap member transmits a warning wave signal based on the detection by said stem member, said stem member comprising:

a hollow accommodating member having a first closed end and a second open end, said accommodating member having an outer air passage extending from said second end to said first end;

a hollow guide received in said outer air passage of said hollow accommodating member, said hollow guide having an outer wall defining an interior air passage extending between opposite third and fourth ends of said guide, said outer wall closing said first air passage between said first closed end and said second open end, said third end being provided with an axially extending guide surface fabricated from electrically insulating material;

electrical conducting means disposed in said interior air passage, said electrical conducting means being slidably received in said axially extending guide surface and electrically insulated from said hollow accommodating member by said guide surface for electrical connection to said cap member when said cap member is mounted on said stem member;

a pressure chamber next to said outer air passage in the vicinity of said first closed end in said accommodating member;

a tire air introducing passage communicating with said outer air passage and the tire at a point closer to said second open end than said pressure chamber;

connecting means for connecting said pressure chamber to said introducing passage;

deforming means for selectively expanding and shrinking in the pressure chamber in accordance with the pressure of the tire air introduced into the pressure chamber through said introducing passage and said connecting means; and instructing means for outputting an instruction signal to said cap member through said electrical conducting means, said instructing means being arranged to move together with said deforming means and contact said electrical conducting means when said deforming means is expanded.

2. The transmitter as set forth in claim 1, wherein said cap member includes:

an electric source;

a circuit electrically connected with said electric source;

contacting means for contacting said electrical conducting means when said cap member is mounted on said stem member, said contacting means being permanently connected with said circuit; and an antenna for outputting a wave signal when said contacting means is brought into contact with said electrical conducting means, said antenna being actuated by said circuit based on the instruction signal.

3. The transmitter as set forth in claim 1 further comprising:

a partition for separating said outer air passage from said pressure chamber; and said connecting means being defined by a bore formed in said partition.

4. The transmitter as set forth in claim 1, wherein said deforming means includes a diaphragm which is expandable according to the tire air pressure lower than a predetermined value in said pressure chamber.

5. The transmitter as set forth in claim 4, further comprising:

said electrical conducting means supporting a tire valve seal for engagement with said fourth end of said hollow guide to releasably seal said interior passage from said outer air passage;

said instructing means further comprising:

a movable terminal secured to said diaphragm;

a fixed terminal opposed to said movable terminal, said fixed terminal being contacted by said movable terminal shifted based on the expansion of said diaphragm; and an electrical conducting spring connecting said fixed terminal and said electrical conducting means, said spring biasing said tire valve seal into said engagement with said fourth end of said guide.

6. A signal transmitter, mounted on the wheel of a vehicle, including a stem member having a longitudinal axis and a cap member being arranged to be detachably mounted on said stem member, wherein said stem member serves as a releasable tire valve when said cap member is detached from said stem member, and wherein said stem member serves as a closed tire valve and detects tire air pressure smaller than a predetermined level when said cap member is attached to said stem member, and wherein said cap member transmits a warning wave signal based on the detection by said stem member, said stem member comprising:

a hollow accommodating member having a first closed end and a second open end;

a first air passage extending in said accommodating member from said second end to said first end;

an electrically conductive path comprising an electrical conductor having an outer end electrically connected to said cap member when said cap member is mounted on said stem member, said conductor having an inner end carrying said tire valve;

an electrical insulating guide received in said first air passage and defining a second passage extending from said second open end to a tire valve end of said guide, said guide enclosing said electrical conductor and being provided with a hollow head portion adjacent to said second open end for engaging and guiding said electrical conductor for movement along said longitudinal axis;

a pressure chamber next to said air passage in the vicinity of said first closed end in said accommodating member;

a partition for separating said first air passage and said pressure chamber;

a tire air introducing passage communicating with said first air passage and the tire at a point closer to said second open end than said pressure chamber;

said partition including a bore for connecting said pressure chamber to said introducing passage;

connecting means for connecting said pressure chamber to said introducing passage;

a diaphragm positioned in said pressure chamber in accordance with pressure relative to a predetermined value, said pressure being the pressure of air introduced into said pressure chamber through said introducing passage and said bore;

said electrically conductive path further comprising a fixed terminal and an electrically conductive resilient member mounted between said partition and said tire valve for urging said tire valve against said tire valve end of said guide to close said second passage when said cap member is attached to said stem member; and instructing means for outputting an instruction signal to said cap member through said electrically conductive path, said instructing means being secured to said diaphragm to contact said terminal.

7. The transmitter as set forth in claim 6, wherein said cap member includes:

an electric source;

a circuit electrically connected with said electric source;

contacting means for contacting said conductor when said cap member is mounted on said stem member, said contacting means being permanently connected with said circuit; and an antenna for outputting a wave signal when said contacting means is brought into contact with said electrical conductor, said antenna being actuated by said circuit based on the instruction signal.

8. The transmitter as set forth in claim 7, said instructing means further comprising:

a movable terminal secured to said diaphragm;

opposed to said fixed terminal, said fixed terminal being contacted by said movable terminal shifted based on the position of said diaphragm.

9. A signal transmitter, mounted on a wheel of a vehicle, including a stem member having a longitudinal axis and a cap member being arranged to be detachably mounted on said stem member, wherein said stem member serves as a tire valve when said cap member is detached from said stem member, and wherein said stem member serves as a closed tire valve and detects tire air pressure smaller than a predetermined level when said cap member is attached to said stem member, and wherein said cap member transmits a warning wave signal based on the detection by said stem member of the smaller pressure, said stem member comprising:

an electrically conductive accommodating member having a first closed end and a second open end, said accommodating member having a first air passage extending from said second end to said first end;

an electrically insulating sleeve member fixed within said first air passage and being hollow to define an inner air passage within said first air passage, said sleeve member having a third open end adjacent to said first closed end and a head portion adjacent to said second open end, said head portion having an inlet;

an electrically conductive rod disposed in said sleeve member, said rod having an outer end outside of said sleeve member to be electrically connected to said cap member when said cap member is mounted on said stem member, said electrically conductive rod having an inner end supporting said tire valve, said electrically conductive rod having a slide section received in said inlet for movement along said longitudinal axis to position said tire valve relative to said third open end;

a pressure chamber next to said first air passage in the vicinity of said first closed end in said accommodating member;

a partition for separating said first air passage and said pressure chamber;

a tire air introducing passage communicating with said first air passage and the tire at a point closer to said second open end than said pressure chamber;

said partition including a bore for connecting said pressure chamber to said introducing passage;

connecting means for connecting said pressure chamber to said introducing passage;

a diaphragm capable of expanding in said pressure chamber in accordance with pressure lower than a predetermined value existing in said pressure chamber and said introducing passage and said connecting means;

a movable terminal secured to said diaphragm;

a fixed terminal opposed to said movable terminal, said fixed terminal being contacted by said movable terminal shifted based on the expansion of said diaphragm;

a resilient, electrically conductive member for urging said tire valve against said third open end to close said inner air passage, said resilient member being connected to said fixed terminal; and instructing means for outputting an instruction signal to said cap member through said fixed terminal, said resilient member, said tire valve and said rod, said instructing means being secured to said diaphragm for movement therewith to move said movable terminal into contact with said fixed terminal.

10. The transmitter as set forth in claim 9, wherein said cap member includes:

an electric source;

a circuit electrically connected with said electric source;

contacting means for contacting said rod when said cap member is mounted on said stem member, said contacting means being permanently connected with said circuit; and an antenna for outputting a wave signal when said contacting means is brought into contact with said rod, said antenna being actuated by said circuit based on said instruction signal.

* * * * *